United States Patent [19]

Britt

[11] Patent Number: 4,886,989

[45] Date of Patent: Dec. 12, 1989

[54] MOTOR MOUNTING METHOD AND MEANS

[75] Inventor: Paul E. Britt, El Paso, Tex.

[73] Assignee: Vebco, Inc., El Paso, Tex.

[21] Appl. No.: 182,508

[22] Filed: Apr. 18, 1988

[51] Int. Cl.$^4$ .............................................. H02K 5/10
[52] U.S. Cl. ........................................ 310/89; 310/88
[58] Field of Search ................... 310/43, 85, 88, 89, 310/91; 52/199; 98/2.14, 42.02, 42.12, 42.13, 42.14, 42.21, 42.22

[56] References Cited

U.S. PATENT DOCUMENTS 3,732,616 5/1973 Masrrodonato et al. ............. 310/89
3,960,063 6/1976 Siemes et al. ...................... 98/42.13

FOREIGN PATENT DOCUMENTS 2716093 10/1978 Fed. Rep. of Germany ........ 52/199

OTHER PUBLICATIONS

Vebco, Inc. product brochure entitled: "A World of Quality Cooler Products", Jul. 1988.

Primary Examiner—Patrick R. Salce
Assistant Examiner—Judson H. Jones
Attorney, Agent, or Firm—Hill, Van Santen, Steadman & Simpson

[57] ABSTRACT

A motor mounting means for a centrifugal coolant pump having its own cooling fans has a housing provided with a supporting surface therein for supporting a motor and flanges extending from one interior wall which index a motor and restrain the motor against rotational movement. A cap is secured to the housing by bolts extending through lugs located on the outside of the housing and into posts in the cap so that the size of the cooling fan is maximized. Index vanes within the cap position the cap and abut against a topside of the motor to secure the motor against the supporting surface.

14 Claims, 1 Drawing Sheet

U.S. Patent
Dec. 12, 1989
4,886,989
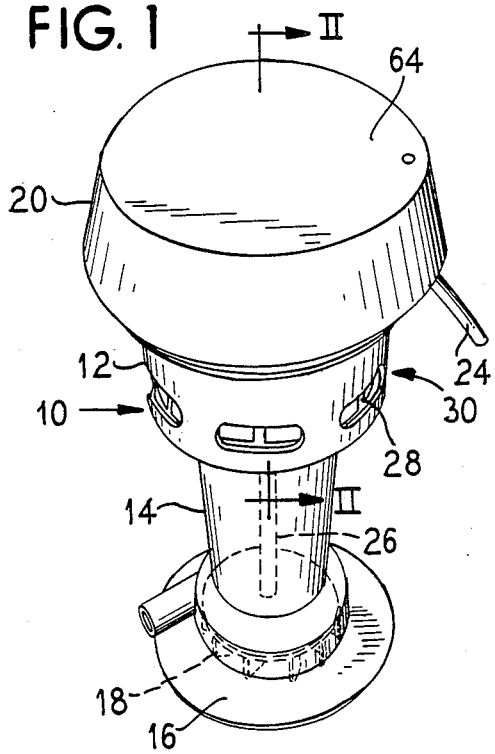
FIG. 1
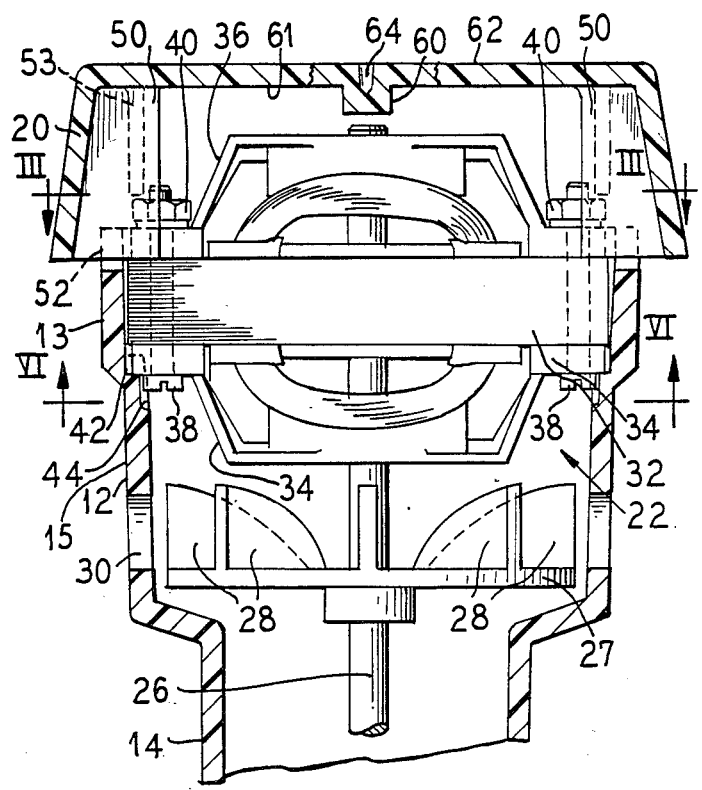
FIG. 2
FIG. 3
FIG. 4
FIG. 5
FIG. 6

MOTOR MOUNTING METHOD AND MEANS

BACKGROUND OF THE INVENTION

1. Field of the Invention

The invention pertains in general to centrifugal coolant pumps for evaporative coolers and, in particular, to a method and means for mounting a motor to drive such pumps.

2. Description of the Related Art

In the related art, a motor mount similar in shape to that shown in FIG. 1 of the drawings, is or was manufactured by Vebco, Inc., El Paso, Tex. Such motor mount includes a cylindrically-shaped motor housing disposed on one end of a cylindrical driveshaft housing. The motor housing comprises a metal can and includes a cap secured thereon.

Another end of the driveshaft housing connects to an impeller housing. The driveshaft housing and impeller housing connect and engage in an indexed twist and lock fashion. A driveshaft extends from a motor mounting within the motor housing through the driveshaft housing and into the impeller housing to an impeller. A plurality of fan blades are located on the driveshaft, below the motor to provide cooling air for the motor.

The motor housing includes motor mounting means disposed therein for supporting the motor in aligned fashion relative to the impeller. Because Underwriters Laboratories' standards do not permit a positive lock of the motor and instead require removability of the motor, the motor is removably secured in the motor housing by the metal cap the inside of which abuts against a topside of the motor. The cap is secured in turn by a pair of studs which extend through the motor housing and cap, each having a nut on both ends.

SUMMARY OF THE INVENTION

In the present invention, a pair of forked lugs are included on opposite outsides of a top rim portion of a motor housing and engage a head portion of a bolt or screw which extends into posts located on the inside of a cap. Thus, studs no longer run through a motor housing and fan blades located below a motor may be extended for increased air movement capacity and better cooling. Moreover, because the bolts or screws extend only into parts located on the inside of the cap, the studs no longer extend through the cap and the cap is leak proof, thereby affording better protection for the unit. Additionally, the bolts or screws are shorter than the original studs and do not require the use of nuts and therefore, material and labor costs are reduced for mounting a motor.

The mounting also provides that the driveshaft housing and motor housing comprise a single plastic housing. Thus, the need for separate driveshaft and motor housings is eliminated.

BRIEF DESCRIPTION OF THE DRAWINGS

In the drawings:

FIG. 1 is a perspective view of a motor mount embodying principles of the invention;

FIG. 2 is a cross-sectional view of the motor mount of FIG. 1 taken along the line II—II;

FIG. 3 is a cross-sectional view of the motor mount of FIG. 2 taken along the line III—III showing a top view of a motor housing from beneath a cap;

FIG. 4 is a cross-sectional view of the motor mount of FIG. 3 taken along the line IV—IV showing indexing of a cap upon a motor within a housing;

FIG. 5 is a fragmentary cross-sectional view of the motor mount of FIG. 3 taken along the line V—V showing how a cap is secured to a motor housing; and FIG. 6 is a cross-sectional view of the motor mount of FIG. 2 taken along the line VI—VI showing the undersides of a motor and a cap.

DESCRIPTION OF THE PREFERRED EMBODIMENT

In FIG. 1, there is shown in perspective view, a motor mount 10 embodying principles of the invention. As can be seen in the figure, the motor mount 10 includes a cylindrically-shaped motor housing section 12 disposed on one end of a tapered cylindrical driveshaft housing section 14. Another end of the driveshaft housing 14 couples with an impeller housing 16 containing an impeller 18. The driveshaft housing 14 engages the impeller housing 16 in an indexed twist and lock fashion.

The motor housing section 12 includes an upper chamber 13 and a lower chamber 15 and is capped by an inverted frustoconically-shaped cap 20. A motor shown generally at 22, is mounted within upper chamber 13. An electrical wire 24 connected to the motor can be seen to protrude from beneath the cap 20 (FIG. 1).

Extending from the motor 22 to the impeller 18 through the driveshaft housing 14 is a driveshaft 26 intended to drive a centrifugal coolant pump for evaporation coolers. Located on the driveshaft 26 and corotatably connected thereto, just below the motor 20 is a rotor 27 carrying a plurality of radial fan blades 28. Fan blades 28 rotate with the driveshaft 26 and provide a flow of cooling air to the motor 20 during operation of the motor. Openings or slots 30 permit cooler air from outside of the motor housing 12 to be exchanged with hotter air from inside the motor housing 12.

In the embodiment illustrated, the motor housing 12, driveshaft housing 14 and cap 20 are made of plastic. Moreover, the motor housing section 12 and driveshaft housing 14 are molded as an integral unit. Of course, these sections could be molded separately or be made of different materials without departing from the spirit of the invention.

In FIG. 2, an upper portion of the motor mount 10 is shown in cross-sectional view. Moreover, the motor 22 is shown mounted within the motor housing 12 within upper chamber 13.

As is shown in FIG. 2, the motor 20 includes a stator 32 and a driveshaft 26 journalled and supported by frame members 34 and 36. Upper frame member 34 and lower frame member 36 support the driveshaft 26 and retain a motor rotor in place. The frame members 34 and 36 are secured on opposite sides of the stator 32 by a suitable plurality of bolts 38 and nuts 40.

Further shown in FIG. 2, is a horizontally aligned interior rim 42 forming a supporting surface ringing the interior of motor housing 12. As is shown, the lower frame member 34 rests upon the rim 42. Because the rim 42 is horizontally aligned, the driveshaft 26 is centrally aligned with respect to shaft housing 14 and is perfectly aligned with a center of the impeller 18. Dimples or recesses 44 in the rim 42 accept or accommodate the heads of the bolts 38 as shown.

Referring to FIGS. 2 and 3, it is shown that the cap 22 includes four index vanes 50 which engage corresponding slots 51 located in a top rim 52 of the motor housing 12. These vanes are aligned substantially radially and serve to support the cap 22 above the top rim 52 of the motor housing 12 and to align the cap relative to the housing 12.

The index vanes 50 further include abutting vane portions 53 which extend vertically within the cap 22 but which do not extend as far as the entire length of flange 50. An edge 55 is formed on each of these abutting vane portions 53 and is disposed to rest upon or abut the top side of motor frame member 36. When the cap 22 is secured to the motor housing 12, the flange portions 53 will secure the motor 20 within the motor housing 12.

The cap 22 further includes two oppositely disposed circumferentially spaced posts 54 for receiving fastening means such as screws or bolts. When the cap 22 is aligned with the motor housing 12, the posts 54 are aligned with forked lugs 56, which are located at an outer perimeter of the rim 52. Thus aligned, a pair of screws or bolts 58 will secure the cap 22 to the housing 12 by threadingly engaging the posts 54 on one end and having a head abut the lugs 56 on the other end.

Because the cap 20 is secured to the motor housing 12 by fastening means located on the outside of motor housing 20 rather than studs located inside the motor housing 20, the fan blades 28 located beneath the motor 20 on the driveshaft 26 may now be increased radially outwardly until they approach near the inside wall of the motor housing 12. Bigger blades 28 will increase the capacity of the rotor 27 and will move more cooling air and thus, more flow of cooling air may be provided to the motor 20 while it is operating.

As shown in FIGS. 2 and 6, a boss 60 is located on the underside 61 of the top surface 62 of cap 20. A recess 64 is drilled into the top surface 62 and partially into the boss 60. The recess 64 in the boss 60 provides a means for restraining the motor mount 10 to keep it from tipping over, without compromising the watertight integrity of the cap 20. A portion of a hook or other means may be inserted into the recess 64 while the remainder is secured to a stable brace.

Referring to FIG. 4, it can be seen that located on or above interior rim 42 are two of four tapered index flanges 70. The flanges 70 are tapered on both ends 72. Two flanges are symetrically located on either side of a dimple 44 which in turn are each centrally aligned with a pair of slots 51.

The flanges 70 serve to align the motor 20 so that a bolt head 38 will be aligned with a dimple 44. Moreover, the flanges restrain the motor against rotational movement. The flanges 70 also support the motor 20 as the underside of the stator 32 rests upon a topside or supporting surface 71 of these flanges 70.

Various modifications may be suggested by those versed in the art without departing from the spirit of the invention. It will be apparent that I wish to embody within the scope of the patent warranted hereon all such modifications as reasonably and properly come within the scope of my contribution to the art.

I claim:

1. Motor mounting means for mounting a motor comprising,
    means forming a supporting surface within a hollow housing having an upstanding wall, said wall having housing lugs positioned on an outside thereof;
    an electric motor on said supporting surface;
    a driveshaft extending downward from said motor;
    means indexing said motor within said housing;
    restraining means holding said motor from rotational movement relative to said supporting surface and securing said motor upon said supporting surface;
    an inverted cup-shaped cap capping said housing lugs located on an outside of said housing and posts located on an inside of said cap, and means interconnecting said lugs and posts;
    means for indexing said cap relative to said housing comprising indexed flanges located on said cap and corresponding slots, located on and formed in said housing; and
    a bolt head on said motor received within a recess located in said supporting surface.

2. Motor mounting means as set forth in claim 1, wherein said means indexing said motor within said housing includes locating surfaces within said housing which engage vertical motor surfaces such that said motor is positioned therebetween.

3. Motor mounting means as set forth in claim 2, further comprising means restraining said housing against movement including a recess in a topside of said cap with means for engaging said recess.

4. A motor mount, comprising:
    means for housing an electric motor including a hollow housing member with an upstanding wall;
    means for supporting said motor within said housing member including means forming first and second surfaces extending inwardly from said wall, said second surface located above said first surface;
    means for restraining said motor against rotation and for locating said motor upon said surfaces including a plurality of flanges extending inwardly from said wall;
    means for engaging a bolt head which secures a cap over said member including a pair of lugs extending outwardly from said wall;
    means for covering a top open side of said member including a cap having a pair of posts for receiving end of a fastener and a plurality of vanes extending inwardly from sides of said cap and downwardly from atop of said cap; and
    means for receiving said vanes in a top edge of said hollow member including slots cut into said top edge.

5. A motor mount as set forth in claim 4, wherein said means forming said first surface comprises a rim ringing an interior wall of said housing member and wherein said second surface comprises a top surface of said flanges.

6. A motor mount as set forth in claim 5, further including a dimple recessed within said rim for accepting a bolt head which protrudes from an underside of said motor.

7. A motor mount comprising:
    means for housing an electric motor including a hollow housing member with an upstanding wall;
    means for supporting said motor within said housing member including means forming first and second surfaces extending inwardly from said wall, said second surface located above said first surface;
    means for restraining said motor against rotation and for locating said motor upon said surfaces including a plurality of flanges extending inwardly from said wall and located between said surfaces;
    means for engaging a bolt head which secures a cap over said member including a pair of lugs extending outwardly from said wall;

means for covering a top open side of said member including a cap having a pair of posts for receiving end of a fastener and a plurality of vanes extending inwardly from sides of said cap and downwardly from atop of said cap; and means for receiving said vanes in a top edge of said hollow member including slots cut into said top edge, said means forming said first surface comprising a rim ringing an interior wall of said housing member and said second surface comprising a top surface of said flanges, and a dimple formed and recessed within said rim for accepting a bolt head which protrudes from an underside of said motor, and further including means for securing said motor against said surfaces comprising a plurality of edges of said vanes which abut a topside of said motor.

8. A motor mount as set forth in claim 7, wherein said cap further includes a boss located on an underside of a top surface and a recess extending into said top surface at said boss without compromising the watertight integrity of the cap for receiving an anti-tipping restraint.

9. Means for mounting a motor, comprising: a hollow housing having an upstanding wall;

first means for supporting a motor disposed within said housing including a first surface extending inwardly from said wall;

second means for supporting said motor including a second surface located above said first surface and extending inwardly from said wall;

means for positioning said motor relative to said housing including a plurality of vertically aligned surfaces located above said first surface which engage a plurality of locations upon a vertical surface of said motor; and means for restraining said motor from rotation upon said first and second means for supporting said motor extending inwardly from said wall.

10. Means for mounting a motor as set forth in claim 9, further comprising means for securing said motor within housing and upon said first and second surfaces including a cap secured over an open topside of said housing.

11. Means for mounting a motor as set forth in claim 10, wherein said cap is secured to said housing by bolts extending through lugs located on an outside wall of said housing and into posts located on an inside of said cap.

12. Means for mounting a motor as set forth in claim 11, further comprising means for indexing said cap relative to said housing including slots located on a top rim of said housing and index vanes located inside said cap.

13. Means for mounting a motor comprising:

a hollow housing having an upstanding wall;

first means for supporting a motor disposed within said housing including a first surface extending inwardly from said wall;

second means for supporting said motor including a second surface located above said first surface and extending inwardly from said wall;

means for positioning said motor relative to said housing including a plurality of vertically aligned surfaces located above said first surface which engage a plurality of locations upon a vertical surface of said motor;

means for restraining said motor from rotation upon said first and second means for supporting said motor extending inwardly from said wall;

means for securing said motor within housing and upon said first and second surfaces including a cap secured over an open topside of said housing, said cap being secured to said housing by bolts extending through lugs located on an outside wall of said housing and into posts located on an inside of said cap, means for indexing said cap relative to said housing including slots located on a top rim of said housing and index vanes located inside said cap, and wherein said index vanes include horizontally extending edges which abut against a top side of said motor when said cap is secured to said housing.

14. A motor mounting means for a centrifugal coolant pump comprising:

a vertical axis motor having a driveshaft extending therefrom, a rotor corotatably connected to said shaft having fan blades extending radially outwardly, a cylindrical housing surrounding said motor and having vented openings in register with said fan blades, an inverted cup-shaped cap member having inwardly extending circumferentially spaced bosses outwardly of said motor housing, said housing having corresponding lugs in register with said bosses and extending outwardly of said housing, whereby the fan blades can be extended to the maximum radial extent of the housing to increase the capacity of the cooling air flow.

* * * * *